(12) United States Patent
Hussein et al.

(10) Patent No.: US 8,067,509 B2
(45) Date of Patent: Nov. 29, 2011

(54) REACTOR SYSTEMS AND PROCESSES FOR USING THE SAME

(75) Inventors: Fathi D. Hussein, Cross Lanes, WV (US); Ping Cai, Lake Jackson, TX (US); Jose F. Cevallos-Candau, Charleston, WV (US); Ian D. Burdett, Charleston, WV (US); W. Scott Hamilton, S. Charleston, WV (US); Daniel N. Thomas, Jr., Scott Depot, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 12/935,415

(22) PCT Filed: Apr. 21, 2009

(86) PCT No.: PCT/US2009/002472
§ 371 (c)(1),
(2), (4) Date: Sep. 29, 2010

(87) PCT Pub. No.: WO2009/131663
PCT Pub. Date: Oct. 29, 2009

(65) Prior Publication Data
US 2011/0034657 A1 Feb. 10, 2011

Related U.S. Application Data

(60) Provisional application No. 61/125,069, filed on Apr. 22, 2008.

(51) Int. Cl.
*C08F 2/34* (2006.01)
*B01J 19/24* (2006.01)
*C08F 210/08* (2006.01)

(52) U.S. Cl. ............. 526/64; 526/68; 526/918; 422/132
(58) Field of Classification Search ................... 526/64, 526/68, 918; 422/132
See application file for complete search history.

(56) References Cited

U.S. PATENT DOCUMENTS
3,709,853 A 1/1973 Karapinka
(Continued)

FOREIGN PATENT DOCUMENTS
EP 453116 A1 10/1991
(Continued)

OTHER PUBLICATIONS

Cai, P. et al. 2005, "Polymerization Simulation Under Different Fluidization Regimes", *Proceedings of the 8th International Conference on Circulating Fluidized Beds*, Hangzhou, China, pp. 410-417.

*Primary Examiner* — Fred M Teskin (57) ABSTRACT

A process for the polymerization of olefin's, including: introducing an olefin and a polymerization catalyst into a polymerization reactor to form a polyolefin, the polymerization reactor including: a fluidized bed region having a top and a bottom; and a motive bed region; wherein a first end of the motive bed region is fluidly connected to the top of the fluidized bed region; and wherein a second end of the motive bed region is fluidly connected to the bottom of the fluidized bed region; and wherein a diameter of the fluidized bed region is greater than a diameter of the motive bed region; circulating at least a portion of the olefin, the catalyst, and the polyolefin through the fluidized bed region and the motive bed region; maintaining a dense-phase fluidized bed within the fluidized bed region; recovering polyolefin from the fluidized bed region, is provided. A reactor system directed to the process is also provided.

13 Claims, 4 Drawing Sheets

U.S. PATENT DOCUMENTS

| | | |
|---|---|---|
| 4,003,712 A | 1/1977 | Miller |
| 4,011,382 A | 3/1977 | Levine et al. |
| 4,302,566 A | 11/1981 | Karol et al. |
| 4,532,311 A | 7/1985 | Fulks et al. |
| 4,543,399 A | 9/1985 | Jenkins et al. |
| 4,803,251 A | 2/1989 | Goode et al. |
| 4,882,400 A | 11/1989 | Dumain et al. |
| 4,933,149 A | 6/1990 | Rhee et al. |
| 4,956,427 A | 9/1990 | Jenkins, III et al. |
| 5,126,414 A | 6/1992 | Cooke et al. |
| 5,352,749 A | 10/1994 | DeChellis et al. |
| 5,428,118 A | 6/1995 | Painter et al. |
| 5,461,123 A | 10/1995 | Song et al. |
| 5,541,270 A | 7/1996 | Chinh et al. |
| 6,905,654 B2 | 6/2005 | Bartilucci et al. |
| 7,122,607 B2 | 10/2006 | Hagerty et al. |
| 7,300,987 B2 | 11/2007 | Hagerty et al. |
| 2008/0027185 A1 | 1/2008 | Markel et al. |

FOREIGN PATENT DOCUMENTS

| | | |
|---|---|---|
| EP | 1484343 A | 12/2004 |
| WO | WO 97/04015 | 2/1997 |
| WO | WO 01/79306 | 10/2001 |
| WO | WO 02/41986 | 5/2002 |
| WO | WO 2006/040240 A1 * | 4/2006 |

* cited by examiner

った. The unreacted gaseous olefin is then
REACTOR SYSTEMS AND PROCESSES FOR USING THE SAME

CROSS-REFERENCE TO RELATED APPLICATIONS

This application is a National Stage application under 36 U.S.C. §371 of International Application No. PCT/US2009/002472, filed Apr. 21, 2009, that claims the benefit of Ser. No. 61/125,069, filed Apr. 22, 2008, the disclosures of which are incorporated by reference in their entireties.

FIELD OF THE INVENTION

Embodiments disclosed herein relate generally to reactor systems and continuous polymerization processes using a gas-phase polymerization reactor. More specifically, embodiments disclosed herein relate to a semi-circulating fluidized bed reactor systems and processes for using the same. Other embodiments disclosed herein relate to processes for producing polyolefins and polyolefin copolymers with a semi-circulating fluidized bed reactor.

BACKGROUND

It is known that many polymers can be produced as powders in fluid bed reactors where the fluidization is provided by a circulating mixture of gases including one or more monomers. For example, vapor phase polymerization is a common process, widely used for the production of polyolefins, such as ethylene, and polyolefin copolymers. One particularly arrangement of a fluid bed polyolefin process is disclosed in U.S. Pat. No. 4,882,400. Other examples of fluid bed polyolefin technology are described in, for example, U.S. Pat. Nos. 3,709,853; 4,003,712; 4,011,382; 4,302,566; 4,543,399; 4,882,400; 5,352,749; 5,541,270; 7,122,607, and 7,300,987. These patents disclose gas phase polymerization processes wherein the polymerization medium is either mechanically agitated or fluidized by the continuous flow of gaseous monomer and diluent.

Figure 1:
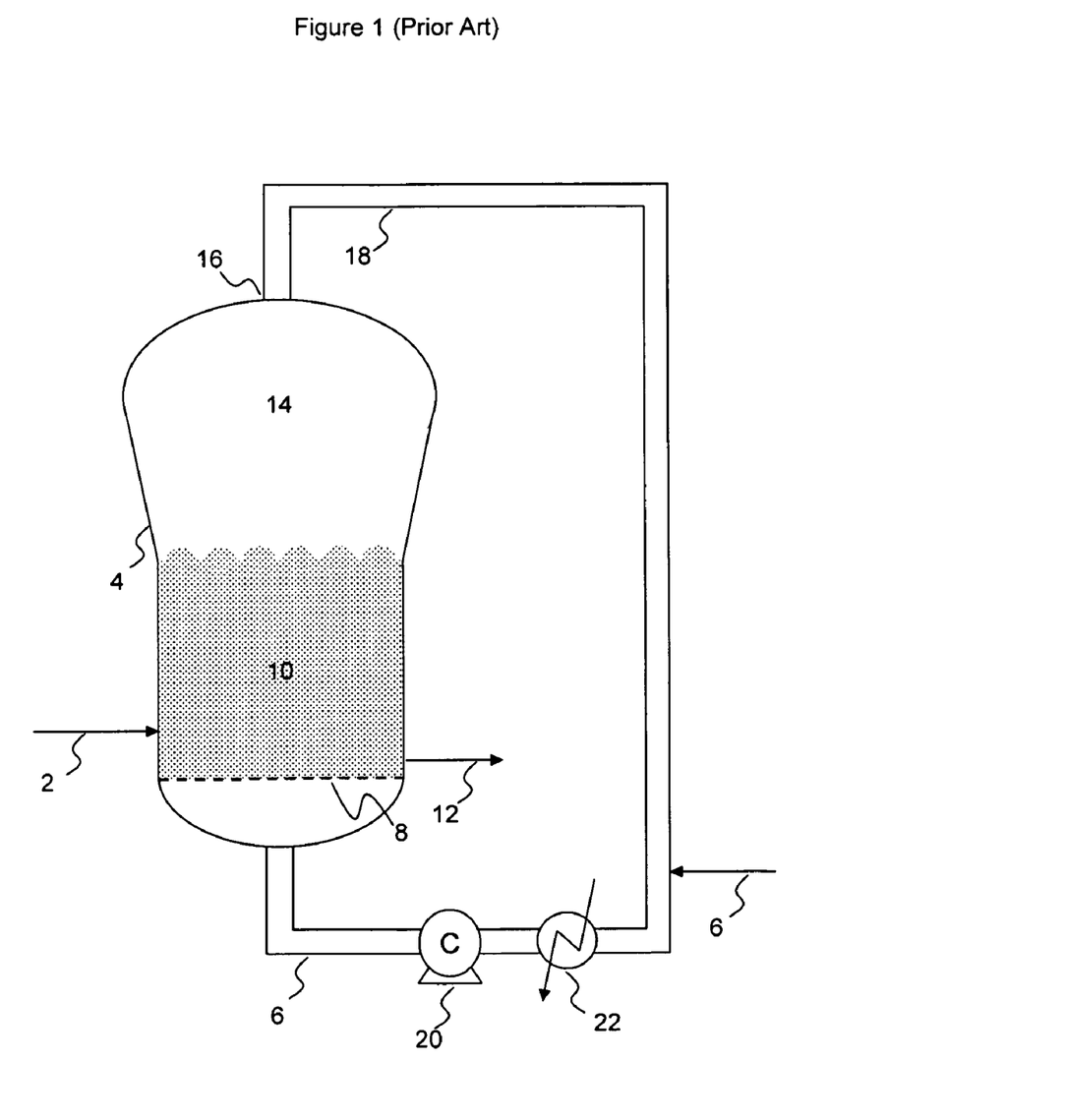
FIG. 1 is a simplified flow diagram of a prior art process for producing polymers in a gas-phase fluidized bed reactor.

One example of a prior art vapor phase polymerization method is illustrated in FIG. 1. A catalyst is fed through supply line 2 into a fluidized bed reactor 4 and, simultaneously, a gaseous olefin is caused to pass through supply line 6 and blown into the bottom of the fluidized bed reactor 4 through a gas distributor plate 8. The gas distributor plate 8 may include, for example, a perforate plate having a plurality of through holes, and is arranged in the vicinity of the bottom of the fluidized bed reactor 4. In this way, a fluidized bed 10 is formed and held in the fluidized state in the fluidized bed reactor 4. Polymerization of the monomer is carried out in the fluidized bed 10, and polymer particles produced by the polymerization reaction are continuously discharged through line 12. Unreacted gaseous olefin having passed through fluidized bed 10 has its flow rate reduced in a velocity reduction zone 14 provided in an upper part of the fluidized bed reactor 4, where the vapor velocity is reduced so as to avoid or reduce entrainment of polymer particles from fluidized bed 10. The unreacted monomer is discharged outside the fluidized bed reactor 4 through gas outlet 16 disposed at a top of velocity reduction zone 14. The unreacted gaseous olefin is then recycled via line 18 to the bottom of fluidized bed reactor 4 via compressor 20. Monomer added via line 6 accounts for monomer reacted to form the polymer removed via flow line 12, thus maintaining a constant supply of monomer to reactor 4. The heat of polymerization generated in fluid bed 10 may be removed from the system by cooling the recycle gas in heat exchanger 22.

The active, growing powder in a fluidized bed polyolefin reactor, such as that described in FIG. 1 and the aforementioned patents, contains a wide range of particle sizes. Thus, the powder is referred to as having a broad particle size distribution. Some of the reasons for the broad size distribution are the size range of the initial catalyst particles (or prepolymer particles) charged to the reactor, the difference in catalytic activity of each catalyst particle, the difference in residence time for each growing polymer particle, the agglomeration of polymer particles, and the spalling of polymer particles.

The size distribution of particles can be characterized by various physical measurements relating to the particle mass, physical dimensions, or specific surface area. Two commonly used methods of measurement, owing to ease and reproducibility, are mechanical sieve analysis and the light scattering behavior of a cloud of particles. The very small polymer particles are called fines. As used in the art, the term "fines" refers to some defined fraction of the polymer powder particles that are smaller than the average of the entire population of powder particles present in the fluid bed. Particularly small polymer particles, for example, smaller than 125 microns, are considered fines.

In the fluid bed processes for the production of polyethylene and ethylene copolymers, high levels of polymer powder fines in the reactor pose significant and well known operating difficulties. Within the reactor, a higher level of fines often leads to increased agglomeration of the polymer powder. Outside the reactor, the fines may deposit in the recycle system and grow, fouling the piping, heat exchangers, compressors, and the reactor inlet gas distribution grid.

Inside the reactor, fines are a leading contributor to the formation of powder agglomerates. For various reasons, fines tend to segregate into certain poorly circulated and poorly cooled regions of the reactor. Exacerbating the segregation problem is the tendency of fines to have higher than average catalytic activity, causing the fines to be hotter than the average particle. This higher catalytic activity in fines is due to higher concentrations of active catalyst components in the fines and due to short diffusion paths for monomers and co-catalyst molecules.

One undesirable place at which fines accumulate is along the reactor vessel wall in the zone occupied by the main fluid bed. This accumulation is believed to occur because fines are more greatly affected by static forces due to their larger ratio of surface area (static charge) to mass (inertia). Thus, fines can cling by static electric forces to the electrically grounded metal wall of the reactor. Polymerization in the stagnant layer of reactor wall fines releases heat which can lead to melting and fusing of polymer into sheets along the vessel wall. These sheets of fused polymer may grow quite large before coming loose and falling into the fluid bed. Once fallen into the main fluid bed, such sheets can obstruct powder fluidization, circulation, and withdrawal. In some cases, the sheets may be so large as to significantly disrupt the normal fluidization and circulation of gas and solids of the entire fluid bed, leading to extensive fusing of the main bed. When powder withdrawal slows or the bed fuses, the reactor production must be stopped and the reactor vessel opened for cleaning. This is a very costly production outage.

Another undesirable place where fines accumulate is in the velocity reduction section of the reaction vessel. The velocity reduction section (disengaging zone) of the reactor is a region of expanded cross-sectional area that is above the zone in which bed level normally resides. The purpose of the expanded area is to reduce the velocity of the fluidizing gas in order to minimize the entrainment of fine particles in the gas leaving the reactor. In the disengaging section, fines tend to concentrate in the regions of lower gas velocity nearer the downward sloping vessel wall. In fact, it is intended that most of the fines fall onto the sloped wall of the disengaging section and slide downwards and back into the main fluidized bed. However, when the concentration of fines increases in the disengaging section, the polymerization heat load on the sloped wall becomes larger. This can be observed by increasing temperatures seen from indicators placed in the sloped wall in the disengaging section. The concentration of fines and resulting heat can become great enough to lead to melting and fusing of the powder into sheets along the sloped wall. These sheets will tend to grow until their own weight and hydrodynamic forces cause them to fall into the main fluid bed, there, as discussed above, obstructing powder withdrawals and possibly causing more extensive bed fusing. As with the above, when either of these occurs, the reactor production must be stopped and the reactor vessel opened for cleaning.

In addition to problems caused inside the reactor, problems are also caused by fines outside the fluid bed reactor vessel. Some fines will leave the reactor vessel in the overhead piping that carries the recycle gas away for cooling and compression. The exiting fines may attach to surfaces of piping, heat exchangers, and other process equipment in the recycle loop. Recycled fines may also settle in regions of lower gas velocity, such as the bottom of the reactor underneath the distribution grid for the fluidizing gas.

Because fines exiting the reactor retain their catalytic activity, they continue to react outside the reactor. Thus, fines depositing in the recycle system equipment grow and fuse to create skins, sheets, and lumps of polymer. These skins, sheets, and lumps reduce heat transfer efficiency and modify mass flow in the recycle gas piping and equipment. Also, some fines will return to the reactor via the recycle system. Because the temperature and gas composition are very different at some locations in the recycle system, the polymer produced outside the reactor may have very undesirable properties. Although a minute fraction of the total polymer production, the fines returning to the reactor can nonetheless seriously impact the suitability of the overall product. The presence of non-homogeneous polymer fines in the final product can significantly affect the quality of the product and resulting articles produced therefrom, such as the formation of gels in polyethylene films.

Several methods for addressing the operating problems associated with fines discussed above are presented in U.S. Pat. Nos. 4,956,427, 4,882,400, 4,803,251, 4,532,311, 5,126,414, 4,933,149, 5,352,749, 5,428,118, 5,461,123, 6,905,654, European Patent Application Publication EP 453,116 A1 and U.S. Patent Application Publication No. 2008/0027185.

In light of the above, there exists a need in the art for gas-phase reactors that may be operated in a manner to avoid the formation of at least one of polymer sheets, skins, lumps, and agglomerates.

SUMMARY

In one aspect, embodiments disclosed herein relate to a process for the polymerization of olefins, including: introducing at least one olefin and a catalyst into a polymerization reactor to form a polyolefin, the reactor including: a fluidized bed region having a top and a bottom; and a motive bed region; wherein a first end of the motive bed region is fluidly connected to the top of the fluidized bed region; and wherein a second end of the motive bed region is fluidly connected to the bottom of the fluidized bed region; and wherein a diameter of the fluidized bed region is greater than a diameter of the motive bed region; circulating at least a portion of the olefin, at least one catalyst, and the polyolefin through the fluidized bed region and the motive bed region; maintaining a dense-phase fluidized bed within the fluidized bed region; recovering polyolefin from the fluidized bed region.

In another aspect, embodiments disclosed herein relate to a fluidized bed reactor system useful for the polymerization of olefins, the system including: a fluidized bed region having a top and a bottom; and a motive bed region; wherein a first end of the motive bed region is fluidly connected to the top of the fluidized bed region; and wherein a second end of the motive bed region is fluidly connected to the bottom of the fluidized bed region; a fluid conduit for introducing a polymerization catalyst to the reactor; a fluid conduit for introducing an olefin to the reactor to form a polyolefin; a circulating device for circulating at least a portion of the olefin, the catalyst, and the polyolefin through the motive bed region and the fluidized bed region and for maintaining a dense-phase fluidized bed within the fluidized bed region; a fluid conduit for recovering polyolefin from the fluidized bed region.

DETAILED DESCRIPTION

Before the present compounds, components, compositions, devices, softwares, hardwares, equipments, configurations, schematics, systems, and/or methods are disclosed and described, it is to be understood that unless otherwise indicated this invention is not limited to specific compounds, components, compositions, devices, softwares, hardwares, equipments, configurations, schematics, systems, methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Embodiments disclosed herein relate generally to reactor systems and continuous polymerization processes using a gas-phase polymerization reactor. More specifically, embodiments disclosed herein relate to a semi-circulating fluidized bed reactor. Other embodiments disclosed herein relate to a process for producing polyolefins and polyolefin copolymers in a semi-circulating fluidized bed reactor. A reactor system refers to a system comprising at least one reactor and all other necessary and optional equipment for the polymerization of olefins.

Figure 2:
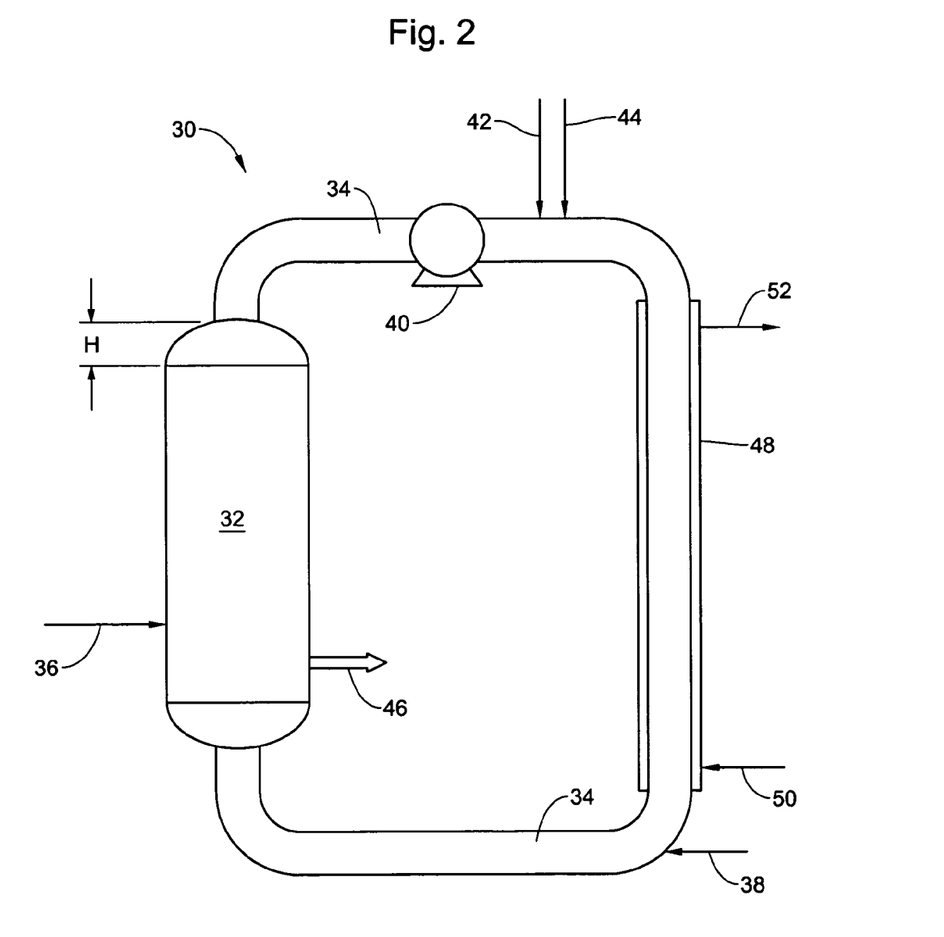
FIG. 2 is a simplified flow diagram of a gas-phase polymerization process according to embodiments disclosed herein.

One embodiment of a semi-circulating fluidized bed reactor for use in the polymerization processes disclosed herein is illustrated in FIG. 2. The semi-circulating fluidized bed reactor 30 includes a fluidized bed region 32 and a motive bed region 34, where the motive bed region 34 is fluidly connected to both the top and the bottom of fluidized bed region 32. The diameter (or equivalent diameter for non-circular reactors) of fluidized bed region 32 is larger than the diameter (equivalent diameter) of motive bed region 34. In contrast to a typical gas-phase reactor, fluidized bed region 32 does not require a vapor disengagement zone, as it is desired to circulate at least a portion of the catalyst and growing polymer particles through the motive bed region, as will be discussed below.

In operation, a catalyst may be added to the fluidized bed region 32 via flow line 36. Simultaneously, a gaseous olefin is caused to pass through supply line 38 and circulated through both fluidized bed region 32 and motive bed region 34 via circulating pump 40. Monomer(s), comonomer(s), hydrogen, catalyst, diluent gas, solvents, and induced condensing agents (ICA's) may be added via one or more of flow lines 42, 44, or other flow lines that may be provided at any point in the reactor loop.

Polymerization of monomer occurs throughout reactor 30, including both the fluidized bed region 32 and the motive bed region 34, and polymer particles produced may be continuously or semi-continuously discharged through line 46. The continuous flow of the gaseous monomer and diluent through the fluidized bed region 32 removes the heat of polymerization from fluidized bed region 32, which is subsequently removed from the system by cooling the components circulating in the motive bed region via heat exchanger 48, such as a cooling jacket used for heat removal and temperature control via circulation of a cooling medium through jacket inlet 50 and jacket outlet 52. A compressor 20 is provided that may be located upstream or downstream of the cooler; in the current view, the compressor is located upstream of the cooler to better control the reactor gas inlet temperature.

Because of the difference in diameters of the fluidized bed region 32 and the motive bed region 34, the fluidizing gases may be circulated at a rate sufficient to entrain at least a portion of the polymer and catalyst particles, resulting in a fast fluidized bed within motive bed region 34 while maintaining a bubbling or turbulent fluidized bed within fluidized bed region 32. For example, the active, growing powder in reactor 30 includes catalyst particles, immature (i.e., small or growing) polymer particles, and mature (or large) polymer particles. The gas velocity may be controlled to be lower than the transport velocity of the mature polymer particles and higher than the transport velocity of the immature particles. In other words, all of the particles form a turbulent bed within the fluidized bed region 32; and a circulating fluidized bed formed by immature particles is superposed on the turbulent bed.

Figure 3:
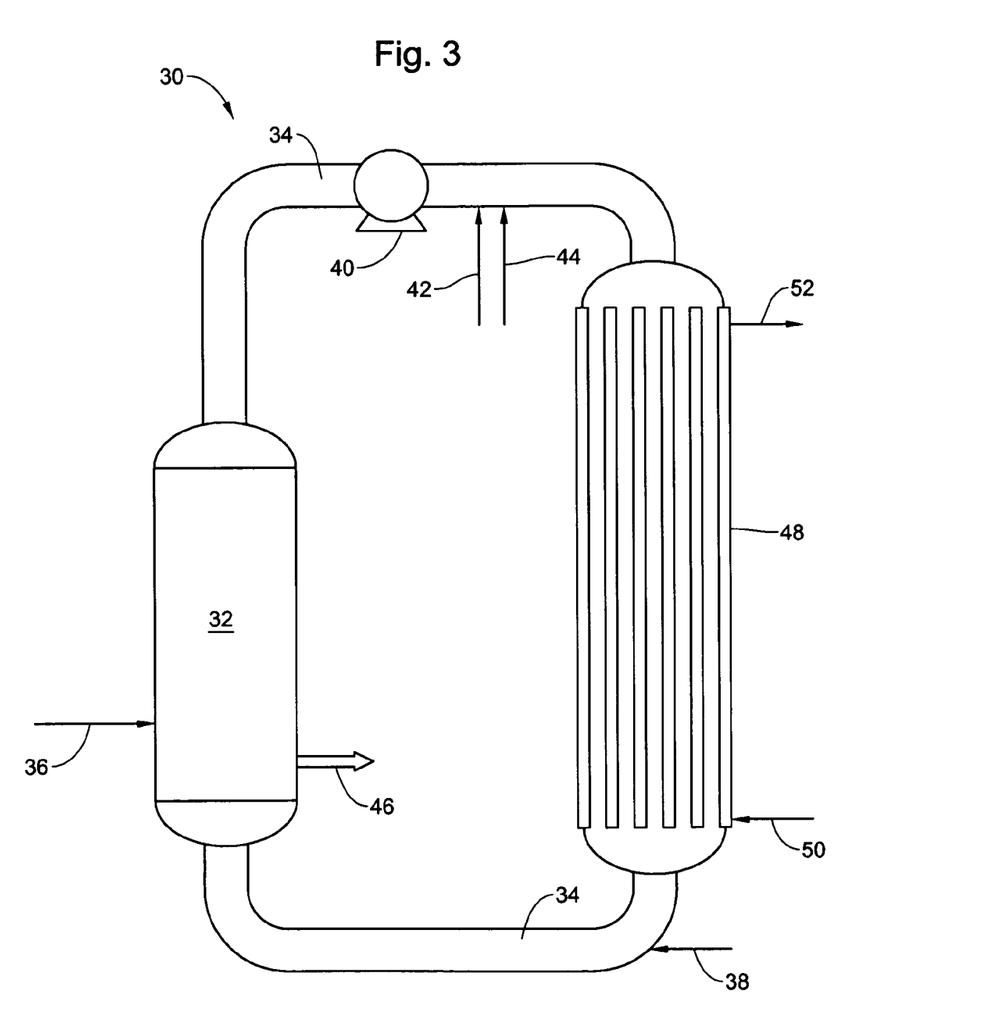
FIG. 3 is a simplified flow diagram of a gas-phase polymerization process according to embodiments disclosed herein.

Referring now to FIG. 3, another embodiment of a semi-circulating fluidized bed reactor according to embodiments disclosed herein is illustrated, where like numerals represent like parts. In this embodiment, heat exchanger 48 may include a shell and tube heat exchanger to efficiently transfer heat between the cooling medium and the circulating components in motive bed region 34. Other appropriate heat exchange devices may also be used to remove the heat of polymerization from the circulating components.

To achieve the desired rate of circulation, circulating device 40 may include any device suitable for circulating a mixture of gases and solids, or gases, solids, and liquids, such as when an induced condensing agent is used. While typical compressors used in a traditional gas-phase reactor may handle minimal solids, such as undesired entrained fines, circulating pump 40 should be suitable for use with higher amounts of solids. In some embodiments, circulating pump 40 may include a compressor, a loop pump, an elbow pump, and a blower.

As described above, gas-phase fluidized bed reactors according to embodiments disclosed herein may be useful for the polymerization of various monomers and comonomers. Additionally, polymerization catalysts, co-catalysts, activators, solvents, and other polymerization modifiers or aids may be used for polymerization processes conducted in the semi-circulating gas-phase fluidized bed reactors described herein. Each of these will be discussed in more detail below.

Processes and apparatus disclosed herein may be useful, for example for the gas-phase polymerization of one or more olefin monomers having from 2 to 30 carbon atoms; olefins having from 2 to 12 carbon atoms in other embodiments; and olefins having from 2 to 8 carbon atoms in yet other embodiments. The gas phase reactor and processes disclosed herein are particularly suited to the polymerization of one or more olefin monomers, such as ethylene, propylene, butene-1, pentene-1,4-methyl-pentene-1,3-methyl-pentene-1, hexene-1, octene-1,3,5,5-tri-methyl-hexene-1, and decene-1.

Other monomers that may be useful in various embodiments disclosed herein may include ethylenically unsaturated monomers, diolefins having 4 to 18 carbon atoms, conjugated or non-conjugated dienes, polyenes, vinyl monomers, and cyclic olefins. Non-limiting examples of such monomers may include norbornene, norbornadiene, isobutylene, isoprene, vinylbenzocyclobutane, styrenes, alkyl substituted styrene, ethylidene norbornene, dicyclopentadiene, and cyclopentene. For example, co-monomers may include those dienes disclosed in U.S. Pat. No. 5,317,036, such as hexadiene, dicyclopentadiene, norbornadiene, and ethylidene norbornene; and readily condensable monomers such as those disclosed in U.S. Pat. No. 5,453,471 including isoprene, styrene, butadiene, isobutylene, and chloroprene, acrylonitrile, and the like.

In a family of embodiments, ethylene-based polymers may be prepared by processes disclosed herein. Such ethylene-based polymers may include homopolymers of ethylene and interpolymers of ethylene and at least one alpha-olefin wherein the ethylene content is at least about 50% by weight of the total monomers involved. Comonomers that may be used may include propylene, 1-butene, 1-pentene, 1-hexene, 1-heptene, 1-octene, 4-methylpent-1-ene, 1-decene, 1-dodecene, 1-hexadecene and the like. Also usable are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur. In one embodiment, the content of the alpha-olefin comonomer incorporated into an ethylene-based polymer may be no greater than 35 mol % in total; from 3 to 25 mol % in other embodiments.

In another family of embodiments, propylene-based polymers may be prepared by processes disclosed herein. Such propylene-based polymers may include homopolymers of propylene and interpolymers of propylene and at least one alpha-olefin wherein the propylene content is at least about 50% by weight of the total monomers involved. Comonomers that may be used may include ethylene, 1-butene, 1-pentene, 1-hexene, 1-heptene, 1-octene, 4-methylpent-1-ene, 1-decene, 1-dodecene, 1-hexadecene and the like. Also usable are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl- 2-norbornene, and olefins formed in situ in the polymerization medium. When olefins are formed in situ in the polymerization medium, the formation of polyolefins containing long chain branching may occur. In one embodiment, the content of the alpha-olefin comonomer incorporated into a propylene-based polymer may be no greater than 35 mol % in total; from 3 to 25 mol % in other embodiments.

Any type of polymerization catalyst may be used in the present processes, including liquid-form catalysts, solid catalysts, and heterogeneous or supported catalysts, among others, and may be fed to the reactor as a liquid, slurry (liquid/solid mixture), or as a solid (typically gas transported). Liquid-form catalysts useful in embodiments disclosed herein should be stable and sprayable or atomizable. These catalysts may be used alone or in various combinations or mixtures. For example, one or more liquid catalysts, one or more solid catalysts, one or more supported catalysts, or a mixture of a liquid catalyst and/or a solid or supported catalyst, or a mixture of solid and supported catalysts may be used. These catalysts may be used with co-catalysts, activators, and/or promoters well known in the art. Examples of suitable catalysts include at least one of or any combination of:

A. Ziegler-Natta catalysts, including titanium based catalysts, such as those described in U.S. Pat. Nos. 4,376,062 and 4,379,758. Ziegler-Natta catalysts are well known in the art, and typically are magnesium/titanium/electron donor complexes used in conjunction with an organoaluminum co-catalyst.

B. Chromium based catalysts, such as those described in U.S. Pat. Nos. 3,709,853; 3,709,954; and 4,077,904.

C. Vanadium based catalysts, such as vanadium oxychloride and vanadium acetylacetonate, such as described in U.S. Pat. No. 5,317,036.

D. Metallocene catalysts, such as those described in U.S. Pat. Nos. 6,933,258 and 6,894,131.

E. Cationic forms of metal halides, such as aluminum trihalides.

F. Cobalt catalysts and mixtures thereof, such as those described in U.S. Pat. Nos. 4,472,559 and 4,182,814.

G. Nickel catalysts and mixtures thereof, such as those described in U.S. Pat. Nos. 4,155,880 and 4,102,817.

H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. In various embodiments, neodymium compounds, particularly neodymium neodecanoate, octanoate, and versatate, are particularly useful rare earth metal catalysts. Rare earth catalysts may be used, for example, to polymerize butadiene or isoprene.

I. Group 15 atom and metal containing catalysts may include Group 3 to Group 12 metal complexes, wherein the metal is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15 atom and metal containing catalysts are disclosed in, for example, WO 99/01460; EP A1 0 893 454; U.S. Pat. No. 5,318,935; U.S. Pat. No. 5,889,128; U.S. Pat. No. 6,333,389; and U.S. Pat. No. 6,271,325. In one embodiment, the Group 15 containing catalyst includes a Group 4 imino-phenol complexes, Group 4 bis(amide) complexes, and Group 4 pyridyl-amide complexes.

The above described catalyst compounds, activators and/or catalyst systems, as noted above, may also be combined with one or more support materials or carriers. For example, in some embodiments, the activator is contacted with a support to form a supported activator wherein the activator is deposited on, contacted with, vaporized with, bonded to, or incorporated within, adsorbed or absorbed in, or on, a support or carrier.

Support materials may include inorganic or organic support materials, such as a porous support material. Non-limiting examples of inorganic support materials include inorganic oxides and inorganic chlorides. Other carriers include resinous support materials such as polystyrene, functionalized or crosslinked organic supports, such as polystyrene divinyl benzene, polyolefins or polymeric compounds, or any other organic or inorganic support material and the like, or mixtures thereof.

The support materials may include inorganic oxides including Group 2, 3, 4, 5, 13 or 14 metal oxides, such as silica, fumed silica, alumina, silica-alumina and mixtures thereof. Other useful supports include magnesia, titania, zirconia, magnesium chloride, montmorillonite, phyllosilicate, zeolites, talc, clays, and the like. Also, combinations of these support materials may be used, for example, silica-chromium, silica-alumina, silica-titania and the like. Additional support materials may include those porous acrylic polymers described in EP 0 767 184. Other support materials include nanocomposites, as described in PCT WO 99/47598, aerogels, as described in WO 99/48605, spherulites, as described in U.S. Pat. No. 5,972,510, and polymeric beads, as described in WO 99/50311.

Support material, such as inorganic oxides, may have a surface area in the range from about 10 to about 700 $m^2/g$, a pore volume in the range from about 0.1 to about 4 cc/g, and an average particle size in the range from about 5 to about 500 μm. In other embodiments, the surface area of the support may be in the range from about 50 to about 500 $m^2/g$, the pore volume is from about 0.5 to about 3.5 cc/g, and the average particle size is from about 10 to about 200 μm. In yet other embodiments, the surface area of the support is in the range from about 100 to about 1000 $m^2/g$, the pore volume is from about 0.8 to about 5.0 cc/g, and the average particle size is from about 5 to about 100 μm. The average pore size of the support material in some embodiments disclosed herein is in the range from 10 to 1000 Å; from about 50 to about 500 Å in other embodiments; and from about 75 to about 450 Å in yet other embodiments.

There are various methods known in the art for producing a supported activator or combining an activator with a support material. In an embodiment, the support material is chemically treated and/or dehydrated prior to combining with the catalyst compound, activator and/or catalyst system. In a family of embodiments, the support material may have various levels of dehydration, such as may be achieved by drying the support material at temperatures in the range from about 200° C. to about 1000° C.

In some embodiments, dehydrated silica may be contacted with an organoaluminum or alumoxane compound. In specifically the embodiment wherein an organoaluminum compound is used, the activator is formed in situ in the support material as a result of the reaction of, for example, trimethylaluminum and water.

In yet other embodiments, Lewis base-containing support substrates will react with a Lewis acidic activator to form a support bonded Lewis acid compound. The Lewis base hydroxyl groups of silica are exemplary of metal/metalloid oxides where this method of bonding to a support occurs. These embodiments are described in, for example, U.S. Pat. No. 6,147,173.

Other embodiments of supporting an activator are described in U.S. Pat. No. 5,427,991, where supported non-coordinating anions derived from trisperfluorophenyl boron are described; U.S. Pat. No. 5,643,847, discusses the reaction of Group 13 Lewis acid compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions; immobilized Group IIIA Lewis acid catalysts suitable for carbocationic polymerizations are described in U.S. Pat. No. 5,288,677; and James C. W. Chien, Jour. Poly. Sci.: Pt A: Poly. Chem, Vol. 29, 1603-1607 (1991), describes the olefin polymerization utility of methylalumoxane (MAO) reacted with silica ($SiO_2$) and metallocenes and describes a covalent bonding of the aluminum atom to the silica through an oxygen atom in the surface hydroxyl groups of the silica.

In some embodiments, the supported activator is formed by preparing, in an agitated, temperature and pressure controlled vessel, a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 5 psia to 20 psia (34.5 to 138 kPa). An inert gas sweep can also be used in assist in removing solvent. Alternate orders of addition, such as slurrying the support material in an appropriate solvent then adding the activator, can be used.

In an embodiment, the weight percent of the activator to the support material is in the range from about 10 weight percent to about 70 weight percent, in the range from about 20 weight percent to about 60 weight percent in other embodiments, in the range from about 30 weight percent to about 50 weight percent in other embodiments, and in the range from about 30 weight percent to about 40 weight percent in yet other embodiments.

Conventional supported catalysts system useful in embodiments disclosed herein include those supported catalyst systems that are formed by contacting a support material, an activator and a catalyst compound in various ways under a variety of conditions outside of a catalyst feeder apparatus. Examples of conventional methods of supporting metallocene catalyst systems are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895, 5,939,348, 546,872, 6,090,740 and PCT publications WO 95/32995, WO 95/14044, WO 96/06187 and WO 97/02297, and EP-B1-0 685 494.

The catalyst components, for example a catalyst compound, activator and support, may be fed into the polymerization reactor as a mineral oil slurry. Solids concentrations in oil may range from about 10 to about 15 weight percent in some embodiments; and from about 11 to about 14 weight percent in other embodiments.

The catalyst compounds, activators and or optional supports used herein may also be spray dried separately or together prior to being injected into the reactor. The spray dried catalyst may be used as a powder or solid or may be placed in a diluent and slurried into the reactor. In other embodiments, the catalyst compounds and activators used herein are not supported.

Processes disclosed herein may optionally use inert particulate materials as fluidization aids. These inert particulate materials can include carbon black, silica, talc, and clays, as well as inert polymeric materials. Carbon black, for example, has a primary particle size of about 10 to about 100 nanometers, an average size of aggregate of about 0.1 to about 10 microns, and a specific surface area from about 30 to about 1500 $m^2/g$. Silica has a primary particle size of about 5 to about 50 nanometers, an average size of aggregate of about 0.1 to about 10 microns, and a specific surface area from about 50 to about 500 $m^2/g$. Clay, talc, and polymeric materials have an average particle size of about 0.01 to about 10 microns and a specific surface area of about 3 to 30 $m^2/g$. These inert particulate materials may be used in amounts ranging from about 0.3 to about 80% in some embodiments, and from about 5 to about 50% in other embodiments, based on the weight of the final product. They are especially useful for the polymerization of sticky polymers as disclosed in U.S. Pat. Nos. 4,994,534 and 5,304,588.

Chain transfer agents, promoters, scavenging agents and other additives may be, and often are, used in the polymerization processes disclosed herein. Chain transfer agents are often used to control polymer molecular weight. Examples of these compounds are hydrogen and metal alkyls of the general formula $M^xR_y$, where M is a Group 3-12 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as $CHCl_3$, $CFCl_3$, $CH_3$—$CCl_3$, $CF_2Cl$—$CCl_3$, and ethyltrichloroacetate. Such promoters are well known to those skilled in the art and are disclosed in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize static in the fluidized-bed reactor, others known as drivers rather than antistatic agents, may consistently force the static from positive to negative or from negative to positive. The use of these additives is well within the skill of those skilled in the art. These additives may be added to the reaction zone separately or independently from the liquid catalyst if they are solids, or as part of the catalyst provided they do not interfere with the desired atomization. To be part of the catalyst solution, the additives should be liquids or capable of being dissolved in the catalyst solution.

As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the catalyst being used. For example, the use of static control agents is disclosed in European Patent No. 0229368 and U.S. Pat. No. 5,283,278 and references cited therein.

For example, if the static charge is negative, then static control agents such as positive charge generating compounds may be used. Positive charge generating compounds may include MgO, ZnO, $Al_2O_3$, and CuO, for example. In addition, alcohols, oxygen, and nitric oxide may also be used to control negative static charges. See, for example, U.S. Pat. Nos. 4,803,251 and 4,555,370.

For positive static charges, negative charge generating inorganic chemicals such as $V_2O_5$, $SiO_2$, $TiO_2$, and $Fe_2O_3$ may be used. In addition, water or ketones containing up to 7 carbon atoms may be used to reduce a positive charge.

In a class of embodiments, when catalysts such as, for example, metallocene catalysts, are used in the fluidized bed polymerization process, control agents such as aluminum stearate may also be employed. The static control agent used may be selected for its ability to receive the static charge in the fluidized bed without adversely affecting productivity. Suitable static control agents may also include aluminum distearate, ethoxlated amines, and anti-static compositions such as those provided by Innospec Inc. under the trade name OCT-ASTAT 2000, a mixture of a polysulfone copolymer, polymeric polyamine, and oil-soluble sulfonic acid.

Any of the aforementioned control agents, as well as those described in, for example, WO 01/44322, listed under the heading Carboxylate Metal Salt and including those chemicals and compositions listed as antistatic agents may be employed either alone or in combination as a control agent. For example, the carboxylate metal salt may be combined with an amine containing control agent (e.g., a carboxylate metal salt with any family member belonging to the KEMAMINE (available from Crompton Corporation) or ATMER (available from ICI Americas Inc.) family of products).

Other static control agents useful in embodiments disclosed herein are well known to those in the art. Regardless of which agent is used, care should be exercised in selecting an appropriate static control agent to avoid introduction of poisons into the reactor. In addition, in selected embodiments, the smallest amount of the agent necessary to bring the static charge into alignment with the desired range should be used.

In some embodiments, the static control agent added to the reactor may be a combination of two or more of the above listed static control agents. In other embodiments, the static control agent(s) may be added to the reactor in the form of a solution or a slurry, and may be added to the reactor as an individual feed stream or may be combined with other feeds prior to addition to the reactor. For example, the static control agent may be combined with the catalyst or catalyst slurry prior to feeding the combined catalyst-static control agent mixture to the reactor.

In some embodiments, the static control agent may be added to the reactor in an amount ranging from 0.05 to 200 ppm, based on the weight of all feeds to the reactor, excluding recycle. In other embodiments, the static control agent may be added to the reactor in an amount ranging from 2 to 100 ppm; and from 4 to 50 ppm in yet other embodiments. In other embodiments, the static control agent may be added to the reactor in an amount of 4 ppm or greater, based on the weight of all feeds to the reactor, excluding recycle.

Embodiments of the processes disclosed herein may also be operated in a condensing mode, similar to those disclosed in U.S. Pat. Nos. 4,543,399, 4,588,790, 4,994,534, 5,352,749, 5,462,999, and 6,489,408, and U.S. Patent Application Publication No. 2005/0137364. Condensing mode processes may be used to achieve higher cooling capacities and, hence, higher reactor productivity. In addition to condensable fluids of the polymerization process itself, other condensable fluids inert to the polymerization may be introduced to induce a condensing mode operation, such as by the processes described in U.S. Pat. No. 5,436,304.

The condensing mode of operation in gas-phase polymerization reactors significantly increases the production rate or space time yield by providing extra heat-removal capacity through the evaporation of condensates in the cycle gas. Additional condensation is often promoted to extend the utility of condensed mode operation by adding an induced condensing agent ("ICA") into the reactor. The amount of ICA that can be introduced into the reactor, however, must be kept below the "stickiness limit" beyond which the fast fluidized bed and/or the dense fluidized bed material may become too sticky to discharge or to maintain a normal fluidization state.

The amount of condensation of liquid in the circulating components in the motive bed region can be maintained at up to 50 percent by weight, for example. This degree of condensation is achieved by maintaining the outlet temperature from the heat exchange located in the motive bed region so as to achieve the required degree of cooling below the dew point of the mixture.

In general, it would be desirable to have a high proportion of the induced condensing agent in the gaseous stream, to enhance the heat-removal from the reactor. Within the polymer particles, there is dissolved ICA, comonomer(s), other hydrocarbon(s), and even monomer(s), with quantities depending on the types those species and the gas composition. Usually the amount of ICA in the circulating stream is one of the most important factors that affect the overall quantity of the dissolved species in the polymer. At certain levels of ICA, an excess amount of the ICA is dissolved into the polymer particles, making the polymer sticky. Therefore, the amount of the ICA that can be introduced into the reactor, must be kept below the "stickiness limit" beyond which the bed material becomes too sticky to discharge or to maintain a normal fluidization state. Each ICA has a different solubility in each specific polymer product, and in general, it is desirable to utilize an ICA having relatively low solubility in the produced polymer, so that more of the ICA can be utilized in the gaseous stream before reaching the stickiness limit.

Suitable ICAs are materials having a low normal boiling point and/or a low solubility in polymers, for example with a normal boiling point less than 25° C. in some embodiments; less than 20° C. in other embodiments; less than 15° C. in other embodiments; less than 10° C. in other embodiments; and less than 0° C. in yet other embodiments.

In a class of embodiments, suitable ICAs include those having a "typical solubility" less than 2.0. In other embodiments, suitable ICAs include those having a typical solubility less than 1.5, less than 1.25, and less than 1.0. In another class of embodiments, suitable ICAs include those having a "typical solubility" less than 40.0, less than 35.0, and less than 25.0. Units, as used here, may be measured in g/100 g-polymer. "Typical solubility" is determined under 90° C. reactor temperature and ICA partial pressure of 25 psi ($1.72 \times 10^5$ Pa), for polyethylene with melt index=1.0 dg/min and resin density=918 kg/m³. In these embodiments, the melt index is determined using ASTM-D-1238.

In some embodiments, suitable ICAs include cyclobutane, neopentane, n-butane, isobutane, cyclopropane, propane, and mixtures thereof. It is recognized within the scope of embodiments disclosed herein that relatively volatile solvents such as propane, butane, isobutane or even isopentane can be matched against a heavier solvent or condensing agent such as isopentane, hexane, hexene, or heptane so that the volatility of the solvent is not so appreciably diminished in the circulation loop (motive bed region). Conversely, heavier solvents may also be used either to increase resin agglomeration or to control resin particle size.

It is also contemplated that embodiments of polymerization processes using an ICA in the semi-circulating fluidized bed reactors disclosed herein may be able to use a higher level of induced condensing agent than is typically used in a traditional gas-phase reactor similar to that illustrated in FIG. 1. The circulating particles may act as a condensation aid/promoter, and may absorb at least some of the condensate without significant softening of the polymer particles. The high velocity of the circulating gases and particles may also reduce the tendency of any softened particles to stick to the walls of the motive bed region. As a result, use of ICA's in a semi-circulating fluidized bed reactor, according to embodiments disclosed herein, may be operated in a super-condensing mode, allowing for increased heat removal from the fluidized bed region and improved production rates over traditional gas-phase processes.

In some embodiments of the processes disclosed herein, catalyst, monomer, comonomer, inert, chain transfer agent, condensing agents, solvents, and other compounds discussed above may be added, individually or in various combinations, directly to the reactor. In some embodiments, these compounds may be added to the fluidized bed region. In other embodiments, these compounds may be added to the motive bed region. In yet other embodiments, some of these compounds may be added to the fluidized bed region while others may be added to the motive bed region.

Hydrogen gas is often used in olefin polymerizations according to embodiments disclosed herein to control the final properties of the polyolefin. Using the catalyst systems described above, it is known that increasing the concentration (partial pressure) of hydrogen may increase the melt flow index (MFI) and/or melt index (MI) of the polyolefin generated. The MFI or MI can thus be influenced by the hydrogen concentration. The amount of hydrogen in the polymerization can be expressed as a mole ratio relative to the total polymerizable monomer, for example, ethylene, or a blend of ethylene and hexene or propylene. The amount of hydrogen used in the polymerization processes of embodiments disclosed herein is an amount necessary to achieve the desired MFI or MI of the final polyolefin resin.

The fluidized bed region of the polymerization processes disclosed herein may be operated over a wide range of temperatures and pressures. The fluidized bed region of the polymerization processes disclosed herein may be operated at temperatures in the range from −60° C. to about 280° C. in some embodiments; from 50° C. to about 200° C. in other embodiments. In other embodiments, the fluidized bed region of the reactors may have a temperature ranging from about 10° C. to about 150° C.; and in another embodiment from about 40° C. to about 125° C. In one embodiment, the temperature in the fluidized bed region may be operated at the highest feasible temperature taking into account the sintering temperature of the polymer within the reactor.

The pressures used may be in the range from about 1 atmosphere to about 500 atmospheres or higher. In one embodiment, the fluidized bed region of the reactor may be operated at pressures ranging from about 0.7 to about 70 bar (about 10 to 1000 psia); and in another embodiment a pressure ranging from about 14 to about 42 bar (about 200 to about 600 psia).

The flow rate of the gas through the semi-circulating fluidized bed reactors described herein, as mentioned above, is selected to result in a bubbling or turbulent fluidized bed in the fluidized bed region and a fast fluidized bed or a dilute-phase convey in the motive bed region. In the fluidized bed region, the gas velocity is controlled to be lower than the transport velocity of "mature" polymer particles and higher than the transport velocity of "immature" polymer particles, as defined above.

The superficial gas velocity in the fluidized bed region may be such that from about 1 percent to about 99 percent of the polymer particles may remain in the fluidized bed region of the reactor. For example, in some embodiments it may be desired to maintain a lesser amount of the particles in the fluidized bed region, where a majority (greater than 50%) of the particles are circulating through the motive bed region, where the greater or lesser amount is based upon the size distribution of the particles in the reactor. In other embodiments, it may be desired to maintain a greater amount of the particles in the fluidized bed region, where a minority of the particles are circulating through the motive bed region.

For example, a particle size distribution may be represented based upon the percent of particles having a diameter greater or less than a particular diameter. A particle size distribution may be listed as Dx (e.g., D10, D25, D50, D75, and D90, where x percent of the particles have a diameter less than a diameter D, and the mean particle size is given as D50, where the particle size distribution may be measured by screening or light scattering, as mentioned previously. Where a majority of the particles remain in the fluidized bed region, the superficial gas velocity in the fluidized bed region may be selected to transport particles having a size smaller than the D10 or D25, for example. Where a majority of the particles circulate through the motive bed region, the superficial gas velocity in the fluidized bed region may be selected to transport particles having a size smaller than the D75 or D90, for example.

The superficial gas velocity in the fluidized bed region of the polymerization reactors disclosed herein may range from about 0.9 to about 4.6 meters/second (about 3 to about 15 feet/second) in some embodiments disclosed herein; from about 1.5 to about 3 meters/second (about 5 to about 10 feet/second) in other embodiments; and from about 2.1 to about 2.7 meters per second (about 7 to about 9 feet per second) in yet other embodiments.

The superficial gas velocity in the motive bed region may vary from point to point, as based on temperature, condensation, and the location of various feeds, such as hydrogen, monomer, and comonomer feeds, among other variables. Regardless, the lowest superficial gas velocity in any section of the motive bed region should be greater than the transport velocity of the particles carried from the fluidized bed region. In this manner, settling of large particles can be minimized or avoided. Although large particles are not as active as smaller particles, typically, similar sheeting, plugging, etc. may occur in areas where a significant amount of large particles is allowed to accumulate. In some embodiments, the initial portion of the motive bed may extend for a minimum height H (see FIG. 2, for example) above the fluidized bed to allow larger entrained particles to settle back to the fluidized bed region following establishment of fluid flow within the conduit. The superficial gas velocity in the motive bed region of the polymerization reactors disclosed herein may be greater than about 1.5 meters per second, for example.

The superficial gas velocity, as described above, is higher in the motive bed region than in the fluidized bed region of the polymerization reactor. As such, the diameter (including equivalent diameter) of the fluidized bed region may be at least 1.1 times that of the diameter (including equivalent diameter) of the motive bed region. In other various embodiments, the diameter (including equivalent diameter) of the fluidized bed region may be at least 1.2, 1.3, 1.4, 1.5, 1.75, 2, 3 or 4 times that of the diameter (including equivalent diameter) of the motive bed region.

Figure 4:
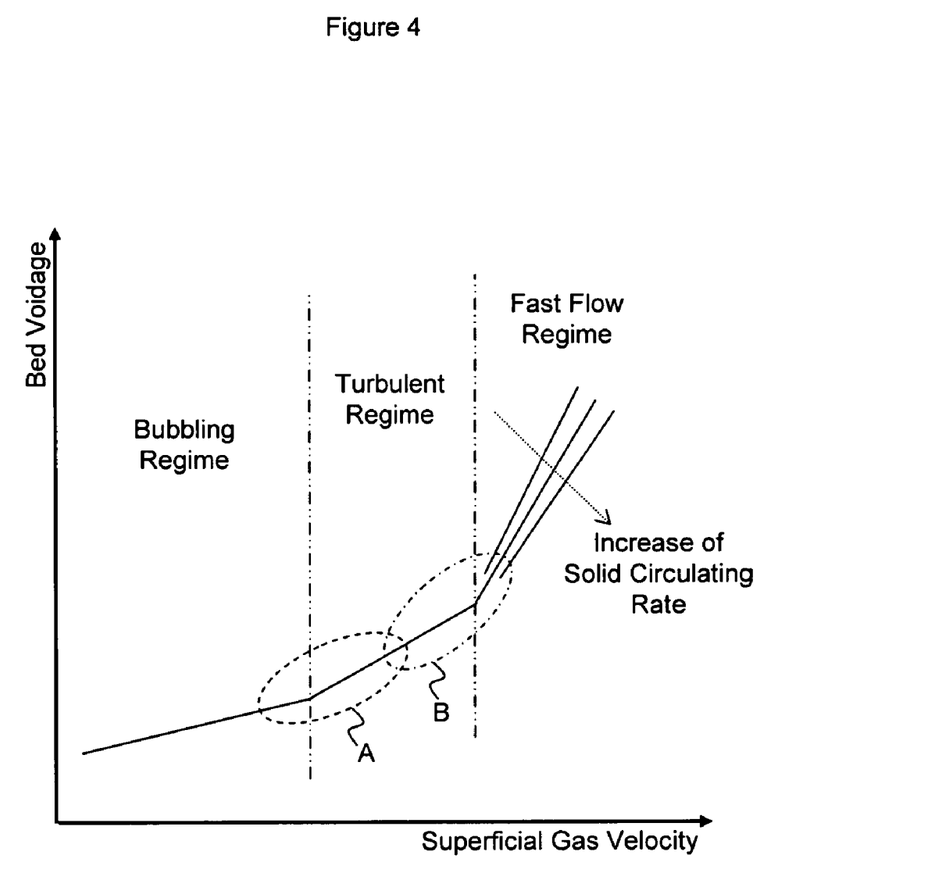
FIG. 4 is a graphical representation of the operating regimes of embodiments disclosed herein as compared to a typical gas-phase fluidized bed reactor.

Referring now to FIG. 4, the operating regimes of embodiments disclosed herein as compared to a typical gas-phase fluidized bed reactor are illustrated. Bed voidage generally increases as the superficial gas velocity is increased. In the bubble regime, transport of gas through a bed of particles results in a uniform distribution of bubbles over the bed; in the turbulent regime, more violent movement of the bed particles are observed; and in the fast fluidization regime, the particles and gas move together through the fluid conduit, such as in a transport reactor. A typical gas-phase reactor is operated in the bubble regime or in the lower portion of the turbulent regime, as illustrated by the region encompassed by circle A. For reactors disclosed herein, the fluidized bed region is typically operated at greater superficial gas velocities than typical gas phase reactors, as represented by circle B, encompassing a portion of the turbulent regime and an initial portion of the fast fluidization regime. The motive bed region for reactors disclosed herein is typically operated at superficial gas velocities well into the fast fluidization regime.

There are no bubbles in the motive bed; all the particles are carried over by high-velocity gas and both solid and gas may be near plug-flow in each pass through the motive bed region. The residence time in the motive bed region is relatively short, where the growing entrained particles typically recycle many times to the fluidized bed region. As a result, the overall performance of the semi-circulating fluidized bed reactor is still similar to a CSTR for the solid phase.

In embodiments disclosed herein, the polymerization process is a continuous gas-phase process that includes the steps of: (a) introducing an olefin and a polymerization catalyst into a polymerization reactor to form a polyolefin, the polymerization reactor having: a fluidized bed region having a top and a bottom; and a motive bed region; wherein a first end of the motive bed region is fluidly connected to the top of the fluidized bed region; and wherein a second end of the motive bed region is fluidly connected to the bottom of the fluidized bed region; and wherein a diameter of the fluidized bed region is greater than a diameter of the motive bed region; (b) circulating at least a portion of the olefin, the catalyst, and the polyolefin through the fluidized bed region and the motive bed region; (c) maintaining a dense-phase fluidized bed within the fluidized bed region; and (d) recovering polyolefin from the fluidized bed region.

In some embodiments, one or more olefins, including ethylene or propylene or combinations thereof, may be prepolymerized in the presence of the catalyst systems described above prior to the main polymerization within the reactors described herein. The prepolymerization may be carried out batch-wise or continuously in gas, solution, or slurry phase, including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and WO 97/44371.

In a family of embodiments, the reactors disclosed herein are capable of producing greater than 500 lbs of polymer per hour (227 Kg/hr) to about 220,000 lbs/hr (100,000 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 Kg/hr) and most preferably greater than 65,000 lbs/hr (29,000 kg/hr) to greater than 100,000 lbs/hr (45,500 kg/hr).

The polymers produced by the processes described herein can be used in a wide variety of products and end-use applications. The polymers produced may include linear low density polyethylene, elastomers, plastomers, high density polyethylenes, medium density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

In yet another embodiment, propylene based polymers are produced according to embodiments disclosed herein. These polymers include atactic polypropylene, isotactic polypropylene, hemi-isotactic and syndiotactic polypropylene. Other propylene polymers include propylene block or impact copolymers. Propylene polymers of these types are well known in the art, see for example U.S. Pat. Nos. 4,794,096, 3,248,455, 4,376,851, 5,036,034 and 5,459,117, all of which are herein incorporated by reference.

The polymers may be blended and/or coextruded with any other polymer. Non-limiting examples of other polymers include linear low density polyethylenes produced via conventional Ziegler-Natta and/or metallocene catalysis, elastomers, plastomers, high pressure low density polyethylene, high density polyethylenes, polypropylenes, and the like.

Polymers produced by the processes disclosed herein and blends thereof are useful in such forming operations as film, sheet, and fiber extrusion and coextrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

It is also contemplated that various embodiments may be practiced utilizing two or more semi-circulating fluidized bed reactors as described herein or use of semi-circulating fluidized bed reactors as described herein in series or parallel with a gas phase reactor, a slurry polymerization reactor, or both.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

The following example is derived from modeling techniques and although the work was actually achieved, the inventors do not present these examples in the past tense to comply with M.P.E.P. §608.01(p) if so required.

A semi-circulating fluidized bed reactor system, similar to the one shown in FIG. 3, is simulated making an ethylene-butene copolymer using a Ziegler-Natta catalyst. The reactor temperature is 91° C., and reactor total pressure is 23.8 bar (344.7 psia). The average circulating gas composition is as shown in Table 1.

TABLE 1

| Component | Mole % |
| --- | --- |
| Ethylene | 26.11 |
| n-Butene | 8.26 |
| Hydrogen | 2.58 |
| Ethane | 4.15 |
| n-Butane | 2.08 |
| iso-Pentane | 12.05 |
| iso-Butane | 0.16 |
| iso-Butene | 0.53 |
| Methane | 2.53 |
| Nitrogen | 41.56 |

The reactor is running under condensing mode with iso-pentane as the induced condensing agent. The polymer density is 0.918 g/cc, and the polymer melt index is 1.0 g/10 min. The production rate is 28100 kg/h (61949 lb/h), and the fluidized bed region has a diameter of 4.6 m (15 ft), and a height of 28.7 m (94 ft), with a superficial gas velocity of 1.5 m/s (4.9 ft/s). The motive bed region includes a portion with a tubular heat exchange section to cool the reaction gas and control the reactor temperature (reference number 48 as illustrated in FIG. 3), where the total length of the cooling section is 51.8 m (170 ft), and there are total 100 cooling tubes; each tube has an outside diameter of about 15.8 cm (0.52 ft), and the superficial gas velocity in the cooling tubes is about 19.3 m/s (63.4 ft/s) (the minimum superficial gas velocity for the motive bed region).

Superficial gas velocities in the fluidized bed region and the motive bed region are used to determine the flow of particles in the reactor, as shown in Table 2 and Table 3. The total residence time of the particles in the semi-circulating fluidized bed reactor is estimated at about 1.25 hours.

TABLE 2

Size of Particles in the Reactor

| Particle Size Distribution | Size (microns) |
| --- | --- |
| $D_{10}$ | 307 |
| $D_{50}$ | 674 |
| $D_{90}$ | 1462 |

TABLE 3

| Reactor Section | Superficial Gas Velocity (m/s) | Particle Size $D_{50}$ (microns) | % of Total Particles In Reactor |
| --- | --- | --- | --- |
| Fluidized Bed Region | 1.5 | 674 | 94 |
| Motive Bed Region | 19.3 to 21.0 | 660 | 6 |

The above-described semi-circulating fluidized beds may result in improved polymerization operations. For example, the increased superficial gas velocity through the fluidized bed region results in improved heat and mass transfer and also results in higher shear forces than in conventional bubble fluidization, each of which may contribute to reduced agglomeration of particles. The high gas velocity and resulting drag force on the polymer particles may additionally result in a decrease of wall fouling, both in the fluidized bed region and the motive bed region.

Additionally, due to the superficial gas velocity used, a majority of the product removed from the fluidized bed region will be mature particles, and may include less fines than is typically removed from a traditional gas-phase reactor where circulation/entrainment of particles is not desired. The decrease in fines in the polymer product may result in a uniform product particle size, which may, in turn, result in product improvements (such as improved compounding/mixing, decreased gels, etc. that may result from a uniform product). The uniform product recovered from the reactor may also be a result of reduced bypass of fresh catalyst particles; because the newly added catalyst particles would typically be entrained with the circulating gases, the fresh catalyst is less likely to be recovered with the product, resulting in enhanced catalyst performance (activity, yield, etc.).

Semi-circulating fluidized bed reactors as disclosed herein may also result in improved startup and transitions as compared to traditional gas-phase reactors. For example, startup times may be reduced as a result of low bed inventory operation without worrying about sheeting and agglomeration. With respect to transitions, due to the ability to control reactor inventory, transitions with a semi-circulating fluidized bed reactor may result in decreased off-grade material.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A process for the polymerization of olefins, comprising:
introducing at least one olefin and at least one catalyst into a reactor to form a polyolefin, the reactor comprising:
a fluidized bed region having a top and a bottom; and
a motive bed region;
wherein a first end of the motive bed region is fluidly connected to the top of the fluidized bed region; and
wherein a second end of the motive bed region is fluidly connected to the bottom of the fluidized bed region; and
wherein a diameter of the fluidized bed region is greater than a diameter of the motive bed region;
circulating at least a portion of the olefin, the catalyst, and the polyolefin through the fluidized bed region and the motive bed region, wherein the superficial gas velocity of the motive bed region is greater than the superficial gas velocity of the fluidized bed region and wherein the superficial gas velocity of the motive bed region is greater than the transport velocity of the particles carried from the fluidized bed region;
maintaining a dense-phase fluidized bed within the fluidized bed region;
recovering polyolefin from the fluidized bed region; and
recovering heat from the circulating olefin in at least one of the fluidized bed region and the motive bed region.

2. The process of claim 1, further comprising feeding at least one of a co-catalyst, a co-monomer, a catalyst activator, an antistatic agent, a solvent, an induced condensing agent, and an inert gas to the reactor.

3. The process of claim 1, wherein the olefin comprises at least one of ethylene, propylene, butene, hexene, and octene.

4. The process of claim 1, wherein the olefin is introduced to the polymerization reactor at a location in the motive bed region.

5. The process of claim 1, wherein the catalyst is introduced to the polymerization reactor at a location in the fluidized bed region.

6. The process of claim 1, wherein the circulating comprises maintaining a superficial gas velocity in the fluidized bed region such that from about 1 to about 99 percent of particles in the polymerization reactor remain in the fluidized bed region.

7. The process of claim 6, wherein the superficial gas velocity in the fluidized bed region is within the range from about 0.9 meters/second to about 4.6 meters/second.

8. The process of claim 7, wherein the superficial gas velocity in the motive bed region is equal to or greater than about 1.5 meters/second.

9. The process of claim 6, wherein the superficial gas velocity in the fluidized bed region is selected to transport particles having a size smaller than at least one of a D10, a D25, a D50, a D75, and a D90 of the particles in the polymerization reactor through the motive bed region of the polymerization reactor.

10. A reactor system comprising:
a fluidized bed region having a top and a bottom; and
a motive bed region;
wherein a first end of the motive bed region is fluidly connected to the top of the fluidized bed region; and
wherein a second end of the motive bed region is fluidly connected to the bottom of the fluidized bed region;
a fluid conduit for introducing a polymerization catalyst to the reactor;
a fluid conduit for introducing an olefin to the reactor to form a polyolefin;
a circulating device for circulating at least a portion of the olefin, the catalyst, and the polyolefin through the motive bed region and the fluidized bed region and for maintaining a dense-phase fluidized bed within the fluidized bed region, wherein the circulating device maintains the superficial gas velocity of the motive bed region greater than the superficial gas velocity of the fluidized bed region and wherein the superficial gas velocity of the motive bed region is greater than the transport velocity of the particles carried from the fluidized bed region;
a fluid conduit for recovering polyolefin from the fluidized bed region; and
at least one heat exchanger to recover heat from the circulating olefin in at least one of the fluidized bed region and the motive bed region.

11. The reactor system of claim 10, wherein the at least one heat exchanger comprises a shell and tube heat exchanger.

12. The reactor system of claim 10, wherein the fluidized bed region has an equivalent diameter at least 1.5 times an equivalent diameter of the motive bed region.

13. The reactor system of claim 10, wherein the circulating device comprises at least one of a compressor, a loop pump, an elbow pump, and a blower.

* * * * *